US008543923B2

United States Patent
Fisher et al.

(10) Patent No.: US 8,543,923 B2
(45) Date of Patent: Sep. 24, 2013

(54) APPARATUS, SYSTEM, AND METHOD FOR DISPLAYING HEALTH SPATIALLY AND TEMPORALLY

(75) Inventors: James A. Fisher, Tucson, AZ (US); Shinobu Fujihara, Yamato (JP); Daniel Loewus-Deitch, Cambridge, MA (US); Michael R. Maletich, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1444 days.

(21) Appl. No.: 11/839,445

(22) Filed: Aug. 15, 2007

(65) Prior Publication Data

US 2009/0049396 A1 Feb. 19, 2009

(51) Int. Cl.
*G06F 15/177* (2006.01)
*G06F 3/048* (2013.01)

(52) U.S. Cl.
USPC .......................................... 715/736; 715/853

(58) Field of Classification Search
USPC .................................................. 715/736, 853
See application file for complete search history.

(56) References Cited

U.S. PATENT DOCUMENTS

| | | | |
|---|---|---|---|
| 5,847,972 A | 12/1998 | Eick et al. | |
| 6,253,240 B1 * | 6/2001 | Axberg et al. | 709/223 |
| 6,687,750 B1 | 2/2004 | Messinger et al. | |
| 6,900,822 B2 | 5/2005 | Germain et al. | |
| 6,909,696 B1 | 6/2005 | Zavgren, Jr. | |
| 6,968,341 B2 | 11/2005 | Hand et al. | |
| 7,093,005 B2 | 8/2006 | Patterson | |
| 7,120,901 B2 | 10/2006 | Ferri et al. | |
| 7,328,260 B1 * | 2/2008 | Muthiyan et al. | 709/224 |
| 7,685,261 B1 * | 3/2010 | Marinelli et al. | 709/220 |
| 7,752,301 B1 * | 7/2010 | Maiocco et al. | 709/224 |
| 2004/0215713 A1 * | 10/2004 | Bish et al. | 709/203 |
| 2005/0055428 A1 * | 3/2005 | Terai et al. | 709/220 |
| 2005/0198247 A1 * | 9/2005 | Perry et al. | 709/223 |
| 2005/0289401 A1 | 12/2005 | Goin et al. | |
| 2006/0101384 A1 | 5/2006 | Sim-Tang et al. | |
| 2009/0279549 A1 * | 11/2009 | Ramanathan et al. | 370/395.4 |

FOREIGN PATENT DOCUMENTS

WO  WO2004008316  1/2004

* cited by examiner

*Primary Examiner* — Doon Chow
*Assistant Examiner* — Le Nguyen
(74) *Attorney, Agent, or Firm* — Kunzler Law Group (57) ABSTRACT

An apparatus, system, and method are disclosed for displaying health spatially and temporally. A status module records a health status for each of a plurality of components at a plurality of temporal instances, wherein the health status instances are recorded in a history file. An interconnection module records interconnection relationships for the plurality of clusters in a resource file. A display module displays a system graphical representation comprising a graphical representation for each of the components, each interconnection relationship for the components, a health status for each component, and a transitional health for each component. The system graphical representation is for a specified temporal instance. The transitional health portrays a change in health status over a plurality of temporal instances.

13 Claims, 5 Drawing Sheets

APPARATUS, SYSTEM, AND METHOD FOR DISPLAYING HEALTH SPATIALLY AND TEMPORALLY

BACKGROUND OF THE INVENTION

1. Field of the Invention

This invention relates to displaying health and more particularly relates to displaying the health spatially and temporally.

2. Description of the Related Art

As data processing systems grow in size and complexity, it is becoming increasingly difficult to identify and isolate problems. For example, the failure of a first component in a data processing system may cause failures of other components. As a result it may be difficult to track the original cause of the failure back to the first component.

Data processing systems typically record log files for components. For example, a hard disk drive array may record a status and any errors for each hard disk drive in a log file. Unfortunately, the source of an error is often not readily apparent from a log file without a careful review of the log file entries. In addition, although a log file may record a failure in a major component, an administrator may be required to carefully review the log file to isolate a sub-component where the failure originated.

Because the data processing system may include a plurality of log files, the administrator may also need to review a number of the log files to identify a time when a failure first occurs and the component that first experienced the failure. The need to carefully review a large number of log files can significantly increase the time required to find the source of a failure, resulting in a significant cost in down time.

SUMMARY OF THE INVENTION

From the foregoing discussion, there is a need for an apparatus, system, and method that display health spatially and temporally. Beneficially, such an apparatus, system, and method would display health spatially and temporally and hence help an administrator to identify a time when a failure first occurs and the component that first experienced the failure.

The present invention has been developed in response to the present state of the art, and in particular, in response to the problems and needs in the art that have not yet been fully solved by currently available methods for displaying health. Accordingly, the present invention has been developed to provide an apparatus, system, and method for displaying health spatially and temporally that overcome many or all of the above-discussed shortcomings in the art.

The apparatus to display health is provided with a plurality of modules configured to functionally execute the steps of recording a health status, recording interconnection relationships, and displaying a system graphical representation. These modules in the described embodiments include a status module, an interconnection module, and a display module. The apparatus may further include a user command module.

The status module records a health status for each of a plurality of components at a plurality of temporal instances. The health status instances are recorded in a history file.

The interconnection module records interconnection relationships for the plurality of components in a resource file. The interconnection relationships may be physical connection relationships. Alternatively, in an embodiment, the interconnection relationships are logical connection relationships.

The display module displays a system graphical representation. The system graphical representation comprises a graphical representation for each of the components, each interconnection relationship for the components, a health status for each component, and a transitional health for each component. The system graphical representation is for a specified temporal instance. The transitional health portrays a change in health status over a plurality of temporal instances.

A system of the present invention is also presented to display health. The system may be embodied in a data processing system. In particular, the system, in one embodiment, includes a plurality of clusters and a computer.

The plurality of clusters store data. Each cluster may comprise a virtual tape server and a tape library. The computer executes computer readable programs. The computer readable programs comprise a status module, an interconnection module, and a display module. The computer readable programs may further include a user command module.

The status module records a health status for each of a plurality of components at a plurality of temporal instances. The health status instances are recorded in a history file.

The interconnection module records interconnection relationships for the plurality of components in a resource file. The interconnection relationships may be physical connection relationships. Alternatively, in an embodiment, the interconnection relationships are logical connection relationships.

The display module displays a system graphical representation. The system graphical representation comprises a graphical representation for each of the components, each interconnection relationship for the components, a health status for each component, and a transitional health for each component. The system graphical representation is for a specified temporal instance. The transitional health portrays a change in health status over a plurality of temporal instances.

A method of the present invention is also presented for displaying health spatially and temporally. The method in the disclosed embodiments substantially includes the steps to carry out the functions presented above with respect to the operation of the described apparatus and system. In one embodiment, the method includes recording a health status, recording interconnection relationships, and displaying a system graphical representation. The method also may include paging through graphical representations for a plurality of instances in response to a user command.

A status module records a health status for each of a plurality of components at a plurality of temporal instances. The health status instances are recorded in a history file.

An interconnection module records interconnection relationships for the plurality of components in a resource file. The interconnection relationships may be physical connection relationships. Alternatively, in an embodiment, the interconnection relationships are logical connection relationships.

A display module displays a system graphical representation. The system graphical representation comprises a graphical representation for each of the components, each interconnection relationship for the components, a health status for each component, and a transitional health for each component. The system graphical representation is for a specified temporal instance. The transitional health portrays a change in health status over a plurality of temporal instances.

References throughout this specification to features, advantages, or similar language do not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention provides an apparatus, a system, and a method for displaying health. Beneficially, such an apparatus, a system, and a method would automatically display health spatially and temporally in a data processing system and allow an administrator to identify and isolate problems related to the data processing system. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays (FPGAs), programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within the modules, and may be embodied in any suitable form and organized within any suitable type of data structure. The operational data may be collected as a single data set, or may be distributed over different locations including different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
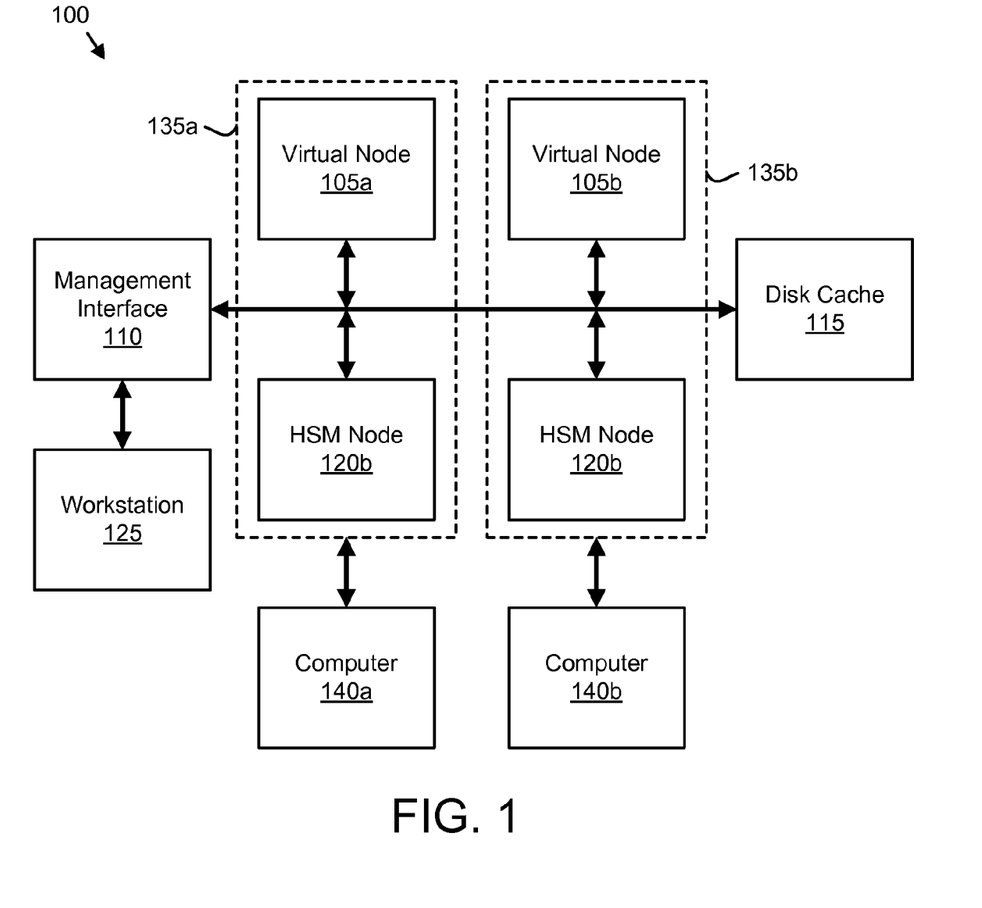
FIG. 1 is a schematic block diagram illustrating one embodiment of a data processing system in accordance with the present invention.

FIG. 1 is a schematic block diagram illustrating one embodiment of a data processing system 100 in accordance with the present invention. The data processing system 100 includes a plurality of clusters 135, a management interface 110, a workstation 125, a plurality of computers 140, and a disk cache 115. Although, for simplicity, the system 100 is shown with two (2) clusters 135, one (1) management interface 110, one (1) workstation 125, two (2) computers 140, and one (1) disk cache 115, any number of clusters 135, management interfaces 110, workstations 125, computers 140, and disk caches 115 may be employed.

The computers 140 may initiate and run all jobs wherein data is to be read from and/or to be written to a plurality of hard disks, magnetic tapes, or the like on the data processing system 100. The computer 140 may be a mainframe computer, a server, or the like with high-speed processors. The computer 140 may have the ability to run or host multiple operating systems. For example, the computer 140 may run or host multiple operating systems such as Linux, SOLARIS®, MICROSOFT WINDOWS® or the like.

The workstation 125 provides access to the management interface 110. In one embodiment, the workstation 125 includes a monitor. The monitor may be employed as an interface between the system 100 and the administrator. The administrator may carry out all functions of the system 100 through the workstation 125.

In an embodiment, the clusters 135 comprise a virtual tape server. The clusters 135 may also comprise a tape library. Each cluster 135 of the plurality of clusters 135 may also include a virtual node 105 and a hierarchical storage manager (HSM) node 120. Each cluster 135 of the plurality of clusters 135 may also include a cache, and a library manager.

Each cluster 135 of the plurality of clusters 135 may be interconnected over a network with each other to form a grid topology. The clusters 135 may also communicate over the network with the management interface 110, the workstation 125, and the disk cache 115 to access the plurality of tape drives, disk drives, other storage devices, and/or the like through one or more storage controllers. The network may be selected from a storage area network (SAN), a token ring network, or the like. The disk cache 115 may be a hard disk drive.

The clusters 135 may provide a single point management of the data to be read/stored using aggregated storage pools in which storage can easily be allocated to the different computers 140, scalability in growing the data processing system 100 by adding the storage devices or storage control nodes, and a platform for implementing advanced functions such as fast-write cache, a point-in-time copy, a transparent data migration, and a remote copy. The clusters 135 may follow an "in-band" approach to read/scratch/write the data. The in-band approach may cause all input/output (I/O) requests and all management and configuration requests to be processed through any of the clusters 135 and/or are to be serviced by any of the clusters 135.

The virtual node 105 may be an independent processor-based virtual tape server with multiple connections to the network. The HSM node 120 may include a cluster manager, a remote file access, a data mover, a physical tape manager, a cache manager, a recall manager, a database, and a media manager.

The virtual node 105 may include either a battery backup unit (BBU) and/or may have access to an uninterruptible power supply (UPS). The virtual node 105 may also include a watchdog timer. The watchdog timer may ensure restart of the failing virtual node 105, if the virtual node 105 is not able to recover and/or takes a long time to recover.

The cluster manager may coordinate all I/O operations between the plurality of clusters 135 in the grid topology. The cluster manager may include a computer readable program.

The remote file access may be a server with one or more processors, a blade server, or the like. The remote file access may provide a link to the disk cache 115 for access by any cluster 135. The data mover may control the actual data transfer operations between the plurality of clusters 135. The data mover may also control operation of the data transfer between hard disks/magnetic tapes and the disk cache 115. For example, the data mover may control the operation of the data transfer between the hard disk/magnetic tape and the disk cache 115. The data mover may include a computer readable program.

The physical tape manager may control the plurality of storage devices in the clusters 135. The physical tape manager may manage the plurality of hard disks/magnetic tapes in multiple pools, reclamation, borrowing and returning of the hard disks/magnetic tapes from and to a common scratch pool, and movement of the hard disks/magnetic tapes between the pools. The physical tape manager may include a computer readable program.

The cache manager may control copying of the data from the cache to the hard disks/magnetic tapes and subsequent scratching the redundant copy of the data from the cache. The cache manager may also provide control signals to balance the data flow between the plurality of clusters 135 and the cache. The cache manager may include a computer readable program.

The recall manager may queue and control an operation of recalling of the data into the cache from the hard disks/magnetic tapes for either the hard disk drive/magnetic tapes drive or for the copies requested by the cluster manager. For example, the recall manager may queue and control the operation of recalling of the data into the disk cache 115 from the second hard disk/magnetic tape through the first cluster 135 for the hard disk drive/magnetic tape drive. The recall manager may include a computer readable program.

The database may be a structured collection of records. The database may be stored on the hard disk drive. The records may include the data stored on the hard disks/magnetic tapes, addresses of locations of the data on the hard disks/magnetic tapes, the tokens or the like. The computer 140 may write the data to the hard disks/magnetic tapes through the cluster 135 and/or may access the data from the hard disks/magnetic tapes through the clusters 135 by using addresses stored in the database.

The management interface 110 may provide information on the plurality of clusters 135 to the administrator. Also, the management interface 110 may allow the administrator to control and configure the clusters 135. The management interface 110 may communicate with the computer 140 and the clusters 135. The management interface 110 may include a computer readable program.

The media manager may manage the physical handling of the hard disks/magnetic tapes. The media manager may also manage error recovery of the hard disks/magnetic tapes. The media manager may diagnose errors and may further determine if the errors are caused by the hard disk drives/magnetic tapes. Further, the media manager may automatically initiate diagnostic actions for any error recovery. The media manager may include a computer readable program.

The library manager may include plurality of tape drives, a robotic accessor, and plurality of the hard disks. The hard disk drives/magnetic tapes may read data from and write data to the hard disks/magnetic tapes as is well known to those skilled in the art. The library manager may also include a logical hard disk drive/magnetic tape drive. The data may be read or scratched from or written to the hard disks/magnetic tapes of the hard disk drive/magnetic tape drive through a read/write channel as is well known to those skilled in the art.

The I/O operations such as read operations and write operations for the hard disk drive/magnetic tape drive mounting the hard disk/magnetic tape may be routed through the disk cache 115. In the data processing system 100, the hard disk drive may cache the data to the disk cache 115 that is to be read from the hard disks/magnetic tapes and/or to be written to the hard disks/magnetic tapes.

Figure 2:
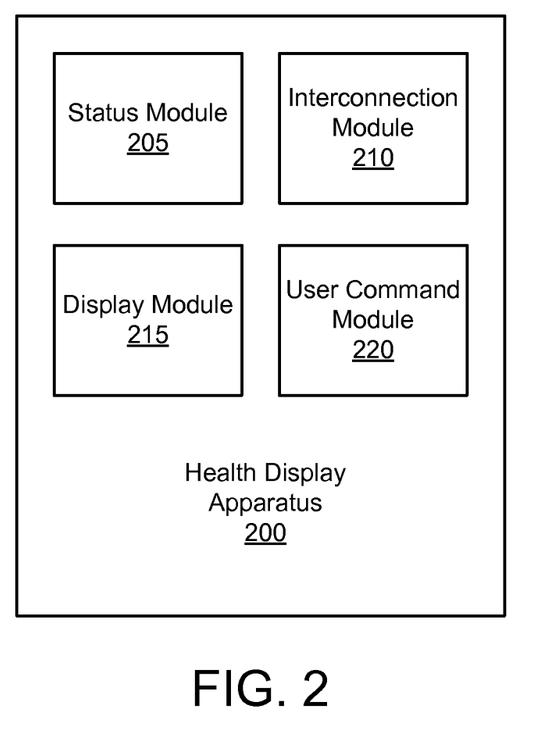
FIG. 2 is a schematic block diagram illustrating one embodiment of a health display apparatus of the present invention.

FIG. 2 is a schematic block diagram illustrating one embodiment of a health display apparatus 200 of the present invention. The apparatus 200 enables displaying health spatially and temporally and can be embodied in the data processing system 100 of FIG. 1. The description of the apparatus 200 refers to elements of FIG. 1, like numbers referring to like elements. The apparatus 200 includes a status module 205, an interconnection module 210, and a display module 215. The apparatus may further include a user command module 220.

The status module 205 records a health status for each of a plurality of components at a plurality of temporal instances. The plurality of temporal instances may include any number of time instances at which the status module 205 records the health status for each cluster 135. In an embodiment, the health status for each cluster 135 and/or each component in each cluster 135 is recorded to a log entry. The log entry may include a time and date of an occurrence as well as a description of the occurrence. For example, the status module 205 may record the health status for each cluster 135 from 2:00 a.m. on Dec. 1, 2006.

The health status of component may be a condition of the component, for example, "good" or "bad". The health status of component may be "good" if the component works properly and "bad" if the component does not work properly. Alternatively, the health status may be a quantitative measure of the health. For example, the health status may be eighty-five percent (85%) of full capacity.

The plurality of components may be the plurality of clusters 135 of FIG. 1, storage devices within the clusters 135, or the like. The plurality of temporal instances may include log entries for a plurality of times. Each log entry may include information related to health status for one or more components.

The health status instances are recorded in a history file. The history file may be a flat file, a linked array, a database, and the like as is known to those skilled in the art. For example, the status module 205 may record the "good" health status for the first cluster 135, the "good" health status for the second cluster 135, the "bad" health status for the third cluster 135, and the "good" health status for the last cluster 135, at 2:45 p.m. on Dec. 1, 2006 in the history file. Similarly, the status module 205 may record the "good" health status for the first cluster 135, the "bad" health status for the second cluster 135, the "bad" health status for the third cluster 135, and the "good" health status for the last cluster 135, at 2:55 p.m. on Dec. 1, 2006 in the history file. The status module 205 may include a software readable program executed by the workstation 125.

The interconnection module 210 records interconnection relationships for the plurality of components in a resource file. The resource file may be a flat file, a linked array, a database, and the like as is known to those skilled in the art. For example, the interconnection module 210 may record interconnection relationships for each cluster 135 of the plurality of clusters 135 in the resource file.

The interconnection relationships may include a type of the relationship among the plurality of components. The resource file may list how the components are interconnected. The components may be configured as the clusters 135 of FIG. 1.

In an embodiment, the interconnection relationships are logical connection relationships. The logical connection relationships may be through logical identifiers identifying source and destination addresses. For example, the interconnection module 210 may record the logical connection relationships for the first cluster 135 and the plurality of other clusters 135 those have logical connection relationships with the first cluster 135 in the resource file by storing the logical identifiers identifying the source and destination addresses each for the first cluster 135 and the plurality of other clusters 135.

Alternatively, the interconnection relationships may be physical connection relationships. The physical connection relationship may be through Ethernet, InfiniBand, Wi-Fi, or the like. For example, the interconnection module 210 may record that the first cluster 135 and the second cluster 135 are physically interconnected through a first Ethernet channel in the resource file. The interconnection module 210 may include a software readable program executed by the workstation 125.

The display module 215 displays a system graphical representation comprising a graphical representation for each of the components, each interconnection relationship for the components, a health status for each component, and a transitional health for each component. Each of the components may be each of the plurality of clusters 135 of FIG. 1. The system graphical representation is for a specified temporal instance. The specified temporal instance may include a time and a date. For example, the display module 215 may display the system graphical representation for each cluster 135 of the plurality of clusters 135, each physical/logical interconnection relationship for the clusters 135, the health status for the clusters 135, and the transitional health for each of the cluster 135 for the specified temporal instance such as 2:00 a.m. on Mar. 11, 2006. The display module 215 may include a software readable program.

In an embodiment, the transitional health for each component is distinguished using a visual attribute such as a color. For example, the transitional health for each cluster 135 may be distinguished using green color for the good health status and red color for the bad health status.

In another embodiment, the transitional health is distinguished using the visual attribute such as a pattern. The pattern may comprise symbols, signs, and the like. For example, the transitional health for each cluster 135 may be distinguished using the pattern such as a group of plus (+) signs of any shape for the good health status and a group of negative (−) signs of any shape for the bad health status.

In one more embodiment, the transitional health for each component is distinguished using the visual attribute such as a periodic change in intensity. For example, the transitional health for each cluster 135 may be distinguished using the periodic change in intensity of color from light red to dark red for the diminishing health status and the periodic change in the intensity of color from light green to dark green for the improving health status of the clusters 135 over the plurality of temporal instances.

The transitional health for each component may also be distinguished using the visual attribute such as a periodic change in color. For example, the transitional health for each cluster 135 may be distinguished using the periodic change in color from green color to red color for the diminishing health status or vice-versa for the improving health status over the plurality of temporal instances.

The transitional health for each component may also be distinguished using the visual attribute such as a simulated motion. The stimulated motion for instance may create an effect of being moving the health status either from the good health status to the bad health status or vice-versa.

The transitional health portrays a change in the health status over a plurality of temporal instances. For example, the transitional health may portray the change in the health status of the first cluster 135 from "good" to "bad" by highlighting the first cluster 135 with green color for the temporal instance of 4:15 p.m. and highlighting the first cluster 135 with red color for the temporal instance of 4:25 p.m. on Jul. 23, 2006. In another example, the transitional health may portray no change in the health status of the fifth cluster 135 by associating no blurring with the fifth cluster 135 and the change in the health status of the seventh cluster 135 by associating blurring with the seventh cluster 135 over the temporal instances between 2:00 p.m. and 2:10 p.m. on Jul. 23, 2006.

The user command module 220 may receive a user command. For example, the user command module 220 may receive the user command to display the system graphical representation over the temporal instance such as 2:00 p.m. on Jul. 23, 2006. The user command module 220 may include a software readable program.

The user command may also be to page through the graphical representations for a plurality of instances. In response to the user command to page through the graphical representations, the display module 215 may page through the graphical representations for the plurality of instances. For example, the display module 215 may page through the graphical representations for the temporal instances between 10:00 a.m. and 11:00 a.m. on Jul. 23, 2006.

Additionally, the user command module 220 may allow the administrator to drill down within the component to display sub-components of the component and the interconnections between the sub-components. The sub-components of the component may include for instance the cache, the physical library, or the like of the cluster 135. For example, the user command module 220 may to allow the administrator to initiate the user command to display the sub-components such as the cache, the physical library of the fifth cluster 135 and the physical or logical interconnections between the cache and the physical library.

Figure 3:
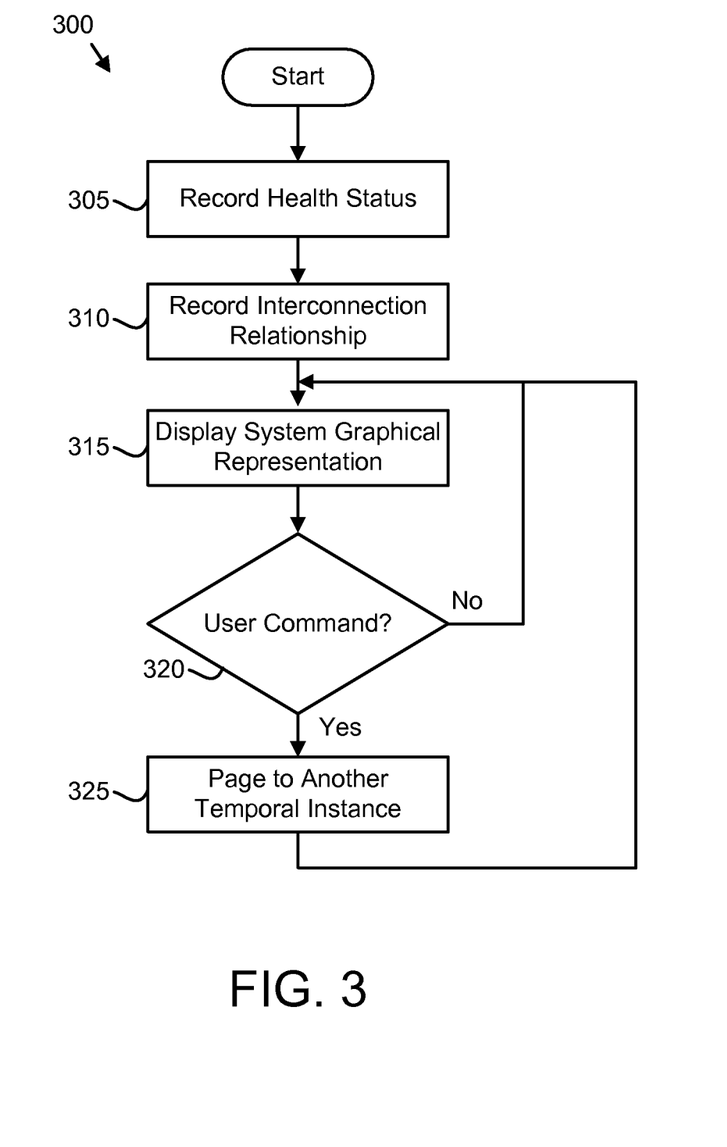
FIG. 3 is a schematic flow chart diagram illustrating one embodiment of a method for displaying health of the present invention.

The schematic flow chart diagram that follows in FIG. 3 is generally set forth as logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and the symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 3 is a schematic flow chart illustrating one embodiment of a method 300 for displaying health. The method 300 substantially includes the steps to carry out the functions presented above with respect to the operation of described data processing system 100 and apparatus 200 of FIGS. 1 and 2. The description of method 300 refers to elements of FIGS. 1 and 2, like numbers referring to the like elements. In one embodiment, the method 300 is implemented with a computer program product comprising a computer readable medium having a computer readable program. The computer program product in combination with the computing system may be capable of performing the method 300. The computer program readable medium may be executed by the workstation 125, computer 140, and/or the cluster manager.

The method 300 starts and in an embodiment, the status module 205 records 305 the health status for each of the plurality of components at the plurality of temporal instances. The status module 205 records 305 the health status instances in the history file. In one embodiment, the history file may be stored in a specified portion of memory of the storage devices within the clusters 135. The health status instances may be recorded by methods known to those skilled in the art.

In a particular example, the system 100 may check the health status at the plurality of temporal instances for each cluster 135 such as 12:35 p.m., 12:45 p.m., and 12:55 p.m. on Dec. 1, 2006 and the status module 205 may automatically record 305 that the first cluster 135 is working at one hundred percent (100%) of the full capacity and the second cluster 135 is working at one hundred percent (100%) of the full capacity, at 12:35 p.m. on Dec. 1, 2006 in the history file.

The interconnection module 210 records 310 interconnection relationships for the plurality of components in the resource file. In one embodiment, the resource file may be stored in a specified portion of the memory of the storage devices within the clusters 135 by methods known to those skilled in the art. The interconnection relationships may be logical connection relationships. Alternatively, the interconnection relationships may be the physical connection relationships.

The display module 215 displays 315 the system graphical representation comprising the graphical representation for each of the components, each interconnection relationship for the components, the health status for each component, and the transitional health for each component for the specified temporal instance. The display module 215 may access the resource file to display 315 the system graphical representation. In an embodiment, the transitional health is distinguished using the visual attributes selected from the color, the pattern, the periodic change in intensity, the periodic change in color, and the simulated motion. The transitional health portrays the change in the health status over the plurality of temporal instances.

A plurality of icons such as shapes of a computer may represent the graphical representations for each cluster 135. A plurality of solid lines such as yellow lines between the plurality of clusters 135 may represent the graphical representations for the physical connection relationships for the plurality clusters 135. A plurality of hash lines such as blue lines between the plurality of clusters 135 may represent the graphical representations for the logical connection relationships for the plurality clusters 135.

A plurality of icons each along side each of the icon for the clusters 135 such as a smiling face may represent the graphical representations for the good health for each of the clusters 135. A plurality of icons each one accompanying the icons for each of the clusters 135 such as a sad face may represent the graphical representations for the bad health for each of the clusters 135. For example, the display module 215 may display 315 the system graphical representation comprising the plurality of the icons of the shape of computer each one accompanied with the icon of the shape of the smiling face or the icon of the shape of the sad face, and the solid lines of yellow color or the hash lines of blue color interconnecting the clusters 135 for the specified temporal instance of 8:00 a.m. on Feb. 1, 2006.

In one more example, the display module 215 may display 315 the system graphical representation comprising the plurality of the icons of the shape of computer each accompanied with the icon of the shape of the smiling face or the icon of the shape of the sad face, the solid yellow lines or the hash blue lines interconnecting the clusters 135. Each of the clusters 135 experiencing a change in the health status may further be associated with the visual attribute such as the periodic change in the intensity of color from light red to dark red of the icons representing the clusters 135 those face/experience a diminish in their health status and the periodic change in the intensity of color from light green to dark green of the icons representing the clusters 135 those face/experience an improvement in their health status over the specified temporal instance between 8:00 a.m. and 8:10 a.m. of Feb. 2, 2006.

The user command module 220 may determine 320 that there is a user command. The administrator may initiate the user command through the workstation 125. The user command may be to display the system graphical representation for the temporal instance, to display the system graphical representation over the previous or next temporal instance, or to page through the graphical representations between the plurality of temporal instances.

If the user command module 220 determines 320 that there is no user command the method 300 may loop to the step 315. For example, in response to no user command, the display module 215 may go on displaying 315 the system graphical representation for the specified temporal instance of 8:00 a.m. on Feb. 1, 2006.

If the user command module 220 determines 320 that there is a user command the display module 215 may page 325 to another temporal instance. For example, in response to the user command to display the system graphical representation over the previous temporal instance of 7:50 a.m. on Feb. 1, 2006, the display module 215 may automatically display 315 the system graphical representation for the specified temporal instance of 7:50 a.m. on Feb. 1, 2006. In another example, in response to the user command to display the system graphical representation over the next temporal instance of 8:10 a.m. on Feb. 1, 2006, the display module 215 may automatically display 315 the system graphical representation for the specified temporal instance of 8:10 a.m. on Feb. 1, 2006.

In one more example, in response to the user command to page up through graphical representations between two temporal instances of 7:00 a.m. and 8:00 a.m. on Feb. 1, 2006 or to page down between two temporal instances of 8:00 a.m. and 9:00 a.m. on Feb. 1, 2006, the display module 215 may automatically display 315 the system graphical representation between temporal instances of 7:00 a.m. and 8:00 a.m. or between temporal instances of 8:00 a.m. and 9:00 a.m. on Feb. 1, 2006 respectively as the case may be. Thus the method 300 would allow the administrator to display health spatially and temporally of each cluster 135 and sub-components.

Figure 4:
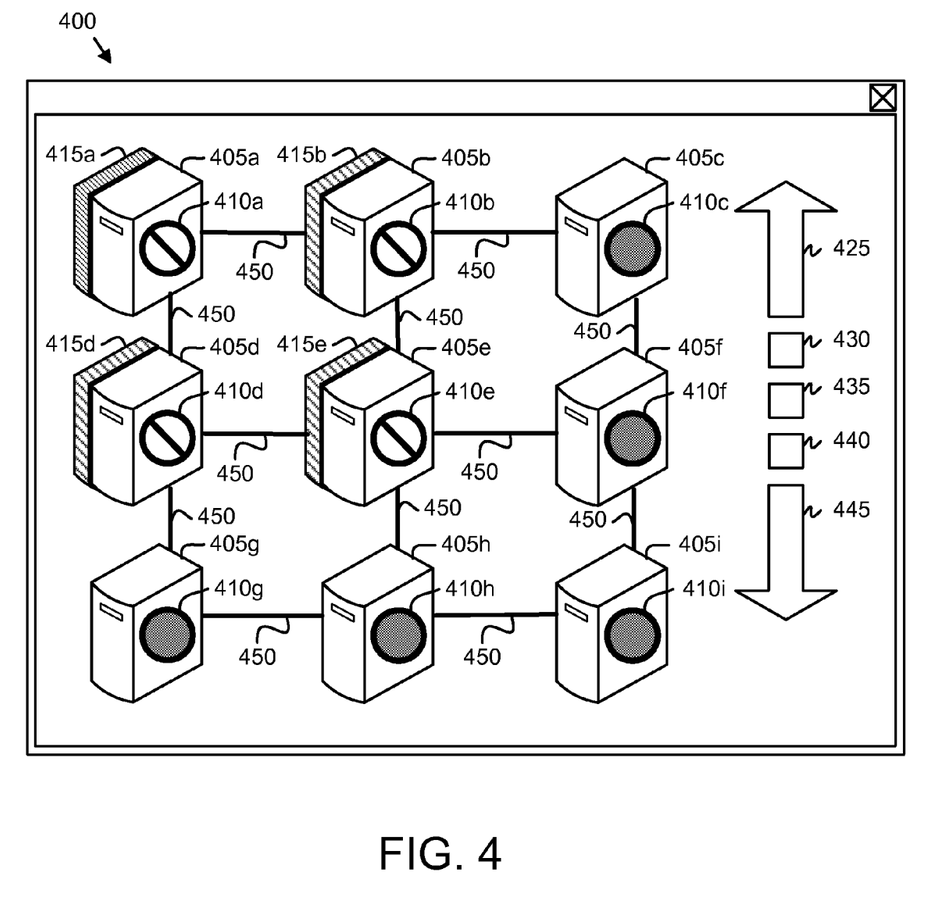
FIG. 4 is a schematic block diagram illustrating one embodiment of a health display of the present invention.

FIG. 4 is a schematic block diagram illustrating one embodiment of a health display 400 of the present invention. The description of diagram 400 refers to elements of FIGS. 1, 2 and 3, like numbers referring to the like elements. The health display 400 includes a plurality computer shaped icons 405(a-i), a plurality of health icons 410(a-i) each shown associated with the corresponding computer shaped icons 405(a-i), a plurality of transitional health icons 415(a, b, d, e) each shown associated with the corresponding computer shaped icons 405(a, b, d, e), a plurality of interconnections 450 connecting the nearest two (2) computer shaped icons 405, a specified temporal instance icon 435, a previous temporal instance icon 440, a next temporal instance icon 430, a large leap forward icon 425, and a large leap backward icon 445.

The health display 400 may be for a specified temporal instance. For example, the health display 400 may be for the temporal instance such as 15:30 p.m. of Feb. 1, 2006.

The plurality computer shaped icons 405(a-i) may represent the corresponding cluster 135 of the plurality of clusters 135 of the system 100. The plurality computer shaped icons 405(a-i) may be rendered in black color.

The plurality of interconnections 450 may represent the logical or the physical interconnection between the clusters 135. For example, the plurality of interconnections 450 of pink color may represent the logical interconnections and the plurality of interconnections 450 of black color may represent the physical interconnections between the two (2) clusters 135 of the plurality of clusters 135.

In the shown embodiment, the plurality of the health icons 410(a-i) include the plurality of the health icons 410(a, b, d, e) and the plurality of the health icons 410(c, f, g, h, i). The plurality of the health icons 410(a, b, d, e) may represent the bad health status and the plurality of the health icons 410(c, f, g, h, i) may represent the good health status for the corresponding cluster 135 of the plurality of clusters 135 for the specified temporal instance.

In the depicted embodiment, the health icons 410(c, f, g, h, i) representing the good health status for the corresponding clusters 135 are shown in the form of thick lined circles with inside portion of each circle rendered with a color. For example, the health icons 410(c, f, g, h, i) may be shown as thick lined circles of black color with inside portion of each circle rendered in green color.

The health icons 410(a, b, d, e) representing the bad health status for the corresponding clusters 135 are shown in the form of thick lined circles with diagonals rendered with a color. For example, the health icons 410(a, b, d, e) may be shown as the thick lined circles of black color with the diagonals rendered in red color.

In an embodiment, the plurality computer shaped icons 405(a, b, d, e) are shown accompanied with the transitional health icons 415(a, b, d, e). The transitional health icons 415(a, b, d, e) are shown in the form of the visual attribute such as the pattern of lines. The transitional health icons 415(a, b, d, e) may be depicted rendered in a color for instance rendered in red color.

The transitional health icon 415a accompanying the computer shaped icon 405a is shown in the form of the pattern of relatively densely populated lines and the transitional health icons 415(b, d, e) accompanying the computer shaped icon 405 are shown in the form of the patterns of relatively thinly populated lines. The transitional health icon 415a in the form of the pattern of densely populated lines may represent relatively worst bad health status and the transitional health icons 415(b, d, e) in the form of the patterns of densely populated lines may represent relatively worse bad health status for the corresponding cluster 135.

In an embodiment, the specified temporal instance icon 435 is shown of the shape of a square. The specified temporal instance icon 435 may represent the temporal instance for the display 400. For example, the specified temporal instance icon 435 may represent the temporal instance such as 15:30 p.m. of Feb. 1, 2006 for the display 400.

The next temporal instance icon 430 is also depicted of the shape of the square. The next temporal instance icon 430 may allow the administrator to navigate and display the system graphical representation for the next temporal instance. For example, by clicking the next temporal instance icon 430 the administrator may navigate and display the system graphical representation for the next temporal instance such as 15:40 p.m. of Feb. 1, 2006.

The previous temporal instance icon 440 is also depicted of the shape of the square. The previous temporal instance icon 440 may allow the administrator to navigate and display the system graphical representation for the previous temporal instance. For example, by clicking the previous temporal instance icon 440 the administrator may navigate and display the system graphical representation for the previous temporal instance such as 15:20 p.m. of Feb. 1, 2006.

The large leap forward icon 425 is shown of the shape of an upright arrow. The administrator may click the large leap forward icon 425 to page through the system graphical representation between the specified temporal instance such as 15:30 p.m. and 16:30 p.m. of Feb. 1, 2006.

The large leap backward icon 445 is shown of the shape of an upside down arrow. The administrator may click the large leap backward icon 445 to page through the system graphical representation between the specified temporal instance such as 15:30 p.m. and 14:30 p.m. of Feb. 1, 2006.

Figure 5:
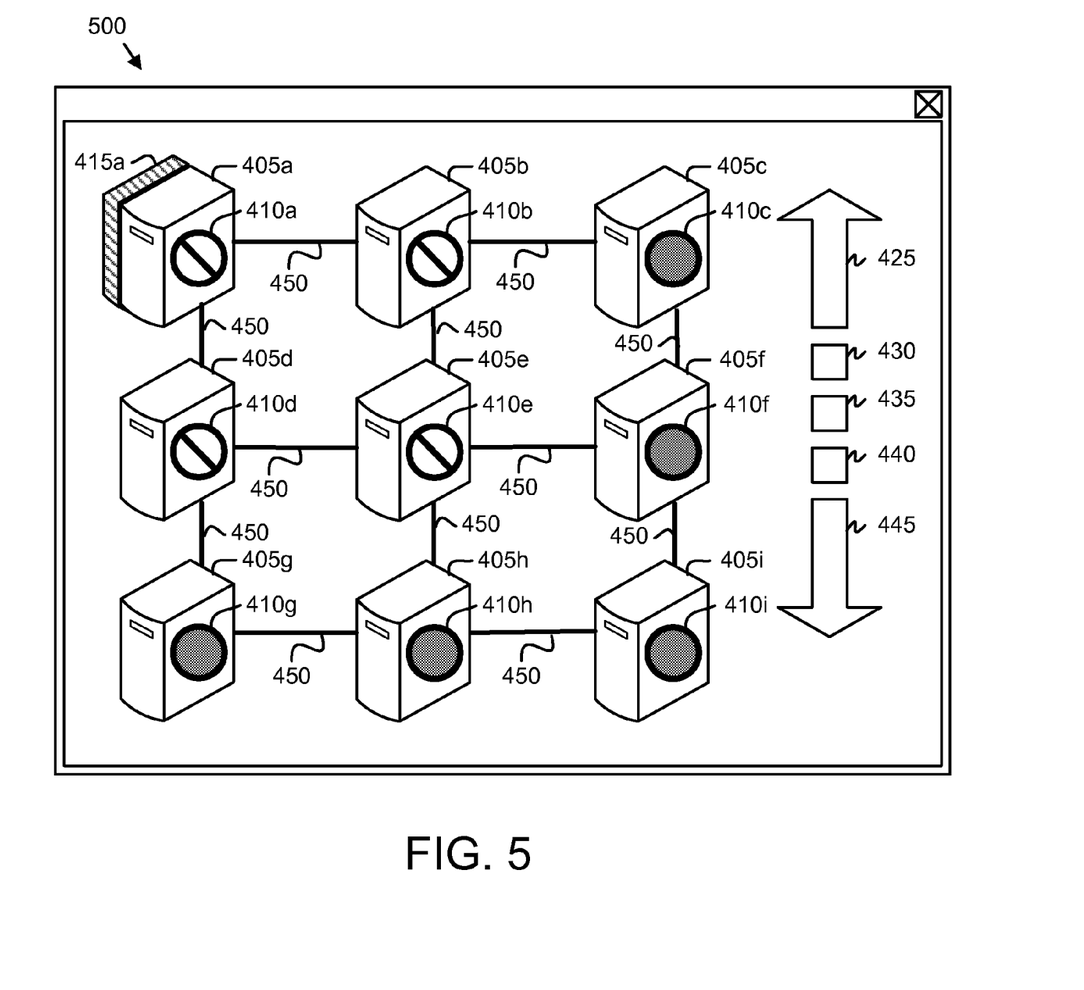
FIG. 5 is a schematic block diagram illustrating one alternate embodiment of a health display of the present invention.

FIG. 5 is a schematic block diagram illustrating one alternate embodiment of a health display 500 of the present invention. The description of diagram 500 refers to elements of FIGS. 1, 2, 3 and 4, like numbers referring to the like elements. The health display 500 is exemplary of a previous temporal instance such as 14:45 p.m. of Feb. 1, 2006.

In the depicted embodiment, the computer shaped icon 405a is shown associated with the health icon 410a. The computer shaped icon 405a is also shown associated with the transitional health icon 415a.

While paging through the previous system graphical representations for the plurality of previous temporal instances, the administrator may detect the first appearance of the health icon 410a associated with the first computer shaped icon 405a for the temporal instance of 14:45 p.m. of Feb. 1, 2006, indicating the start of the bad health status for the corresponding cluster 135 of the plurality of clusters 135. Additionally, the administrator may detect the appearance of the transitional health icon 415a in the form of thinly populated pattern of lines associated with the computer shaped icon 405a for the temporal instance of 14:45 p.m. of Feb. 1, 2006 indicating the worse bad health status for the corresponding cluster 135 of the plurality of clusters 135.

Thus the administrator may infer from the display 500 that the problem of the bad health status for the cluster 135 started from the temporal instance of 14:45 p.m. of Feb. 1, 2006. The administrator may also infer from viewing the display 400 and the display 500 that the problem is spreading for the next temporal instances between 14:45 p.m. and 15:30 p.m. of Feb. 1, 2006.

The exemplary display 400 and 500 allow the administrator to easily identify the clusters 135 with the bad health status at the specified temporal instance. Further, the administrator may easily navigate through the previous or next system graphical representation for the previous or next temporal instance to detect the unhealthy components, to view the instance of an occurrence, and to detect a most probable cause of the occurrence. The administrator may immediately isolate the clusters 135 experiencing the bad health status.

The present invention provides an apparatus, a system, and a method for displaying health. Beneficially, such an apparatus, a system, and a method would automatically display health spatially and temporally in a data processing system and allow an administrator to identify and isolate problems related to the data processing system. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to display health, the apparatus comprising:
   a computer readable program stored on a computer readable storage medium;
   a processor executing the computer readable program, the computer readable program comprising:
      a status module recording a health status for each of a plurality of components at a plurality of temporal instances, wherein each component comprises a virtual tape server, a tape library, and a hierarchical storage manager, the health status instances are recorded in a history file, and each health status instance comprises a percentage of full capacity of the component;
      an interconnection module recording interconnection relationships for the plurality of components in a resource file; and
      a display module displaying a system graphical representation comprising a graphical representation for each of the components, each interconnection relationship for the components, a health status for each component, and a transitional health for each component, wherein the system graphical representation is for a first specified temporal instance and the transitional health portrays a change in health status over the plurality of temporal instances, the transitional health portraying a diminishing health status with a first simulated motion and portraying an improving health status with a second simulated motion, the display module further paging through graphical representations for the plurality of instances to a second specified temporal instance at a specified time and date in response to a command.

2. The apparatus of claim 1, the computer readable program further comprising a user command module receiving the command.

3. The apparatus of claim 1, wherein the interconnection relationships are physical connection relationships.

4. The apparatus of claim 1, wherein the interconnection relationships are logical connection relationships.

5. A computer program product comprising a non-transitory computer readable storage medium storing a computer readable program, wherein the computer readable program when executed on a computer causes the computer to:
   record a health status for each of a plurality of components at a plurality of temporal instances, wherein each component comprises a virtual tape server, a tape library, and a hierarchical storage manager, the health status instances are recorded in a history file, and each health status instance comprises a percentage of full capacity of the component;
   record interconnection relationships for the plurality of components in a resource file;
   display a system graphical representation comprising a graphical representation for each of the component, each interconnection relationship for the components, a health status for each component, and a transitional health for each component, wherein the system graphical representation is for a first specified temporal instance and the transitional health portrays a change in health status over the plurality of temporal instances, the transitional health portraying a diminishing health status with a first simulated motion and portraying an improving health status with a second simulated motion; and
   paging through graphical representations for the plurality of instances to a second specified temporal instance at a specified time and date in response to a command.

6. The computer program product of claim 5, wherein the components are configured as clusters.

7. The computer program product of claim 5, wherein the interconnection relationships are physical connection relationships.

8. The computer program product of claim 5, wherein the interconnection relationships are logical connection relationships.

9. A system to display health, the system comprising:
   a plurality of clusters configured to store data;
   a computer configured to execute computer readable programs stored on a computer readable storage medium, the computer readable programs comprising
      a status module recording a health status for each of a plurality of clusters at a plurality of temporal instances, wherein each cluster comprises a virtual tape server, a tape library, and a hierarchical storage manager, the health status instances are recorded in a history file, and each health status instance comprises a percentage of full capacity of the cluster;

an interconnection module recording interconnection relationships for the plurality of clusters in a resource file; and a display module displaying a system graphical representation comprising a graphical representation for each of the clusters, each interconnection relationship for the clusters, a health status for each cluster, and a transitional health for each cluster, wherein the system graphical representation is for a first specified temporal instance and the transitional health portrays a change in health status over the plurality of temporal instances, the transitional health portraying a diminishing health status with a first simulated motion and portraying an improving health status with a second simulated motion, the display module further paging through graphical representations for the plurality of instances to a second specified temporal instance at a specified time and date in response to a command.

10. The system of claim 9, the computer readable programs further comprising a user command module receiving the command.

11. The system of claim 9, wherein the health status for each cluster is recorded in a log entry.

12. The system of claim 9, wherein the interconnection relationships are physical connection relationships.

13. The system of claim 9, wherein the interconnection relationships are logical connection relationships.

* * * * *